(12) United States Patent
Chang et al.

(10) Patent No.: US 10,142,436 B2
(45) Date of Patent: Nov. 27, 2018

(54) ENHANCED MODE CONTROL OF CACHED DATA

(71) Applicant: Microsoft Technology Licensing, LLC, Redmond, WA (US)

(72) Inventors: MingChieh Chang, Taipei (TW); Shih-Chia Wang, Taipei (TW); Ting-Yu Chang, Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 366 days.

(21) Appl. No.: 14/945,934

(22) Filed: Nov. 19, 2015

(65) Prior Publication Data
US 2017/0149918 A1 May 25, 2017

(51) Int. Cl.
*H04L 29/08* (2006.01)
*H04L 29/06* (2006.01)

(52) U.S. Cl.
CPC ...... *H04L 67/2842* (2013.01); *H04L 65/4076* (2013.01); *H04L 67/2852* (2013.01); *H04L 67/1097* (2013.01)

(58) Field of Classification Search
CPC ............ H04L 67/2842; H04L 65/4076; H04L 67/2852; H04L 67/1097
See application file for complete search history.

(56) References Cited

U.S. PATENT DOCUMENTS

| 5,434,994 | A | 7/1995 | Shaheen et al. |
| 5,706,435 | A | 1/1998 | Barbara et al. |
| 5,826,253 | A | 10/1998 | Bredenberg |
| 6,112,231 | A | 8/2000 | DeSimone et al. |
| 6,128,648 | A | 10/2000 | Chen et al. |
| 6,219,676 | B1 | 4/2001 | Reiner |

(Continued)

FOREIGN PATENT DOCUMENTS

| EP | 1406167 A1 | 4/2004 |
| WO | WO2000045300 A1 | 8/2000 |

OTHER PUBLICATIONS

Pitoura, et al., "Multiversion Data Broadcast", In IEEE Transactions on Computers, vol. 51, Iss.10, Oct. 2002, pp. 1224-1230.

(Continued)

*Primary Examiner* — Oanh Duong
(74) *Attorney, Agent, or Firm* — Jacob P. Rohwer; Newport IP, LLC

(57) ABSTRACT

Described herein are techniques and systems for controlling a broadcast mode and a timer mode to update data stored in respective caches of multiple cache servers. When a cache server is operating in the broadcast mode, the cache server receives a data update or a notification of a data update from a broadcast server. When a cache server is operating in the timer mode, the cache server updates its cache without the use of, or reliance upon, the broadcast server. A cache server is configured to operate in the broadcast mode based on a determination that the broadcast server is capable of broadcasting (e.g., sending) messages and/or data updates to the cache servers. In contrast, a cache server is configured to operate in the timer mode based on a determination that the broadcast server is incapable of broadcasting messages and/or data updates to the cache servers.

20 Claims, 8 Drawing Sheets

(56) References Cited

U.S. PATENT DOCUMENTS

| | | | | |
|---|---|---|---|---|
| 6,512,774 | B1* | 1/2003 | Vepa | H04L 69/40 |
| | | | | 370/242 |
| 6,772,435 | B1* | 8/2004 | Thexton | H04N 7/16 |
| | | | | 348/E7.054 |
| 7,756,603 | B1* | 7/2010 | Delaney, III | H01R 4/2404 |
| | | | | 198/459.8 |
| 7,836,031 | B2 | 11/2010 | Howard et al. | |
| 8,199,117 | B2 | 6/2012 | Izadi et al. | |
| 8,285,808 | B1* | 10/2012 | Joel | G06F 17/30905 |
| | | | | 709/213 |
| 8,364,650 | B2 | 1/2013 | Janin et al. | |
| 2002/0053004 | A1 | 5/2002 | Pong | |
| 2002/0078209 | A1* | 6/2002 | Peng | H04L 29/06 |
| | | | | 709/227 |
| 2003/0079085 | A1* | 4/2003 | Ang | G06F 12/0817 |
| | | | | 711/122 |
| 2003/0204678 | A1* | 10/2003 | Lee | H04L 29/06 |
| | | | | 711/144 |
| 2006/0248284 | A1 | 11/2006 | Petev | |
| 2009/0204996 | A1* | 8/2009 | Kim | H04N 5/445 |
| | | | | 725/54 |
| 2011/0320700 | A1* | 12/2011 | Bronson | G06F 12/0846 |
| | | | | 711/106 |
| 2013/0060631 | A1* | 3/2013 | Corson | G06Q 30/0241 |
| | | | | 705/14.46 |
| 2013/0097236 | A1* | 4/2013 | Khorashadi | H04H 60/25 |
| | | | | 709/204 |
| 2014/0269482 | A1* | 9/2014 | Pandey | H04W 4/06 |
| | | | | 370/312 |
| 2015/0074261 | A1* | 3/2015 | Garg | H04L 43/00 |
| | | | | 709/224 |
| 2017/0041360 | A1* | 2/2017 | Wallace | H04W 48/16 |

OTHER PUBLICATIONS

Yu, et al., "A Scalable Web Cache Consistency Architecture", in the Proceedings of the ACM SIGCOMM Conference on Applications, Technologies, Architectures, and Protocols for Computer Communication, Sep. 3, 1999, pp. 1-35.

Nguyen, et al., "An Adaptive Cache Consistency Strategy in a Disconnected Mobile Wireless Network", In International Conference on Computer Science and Automation Engineering, vol. 4, Jun. 10, 2011, pp. 256-260.

"International Search Report & Written Opinion Issued in PCT Application No. PCT/US2016/061792", dated Feb. 8, 2017, 13 Pages.

"International Preliminary Report on Patentability Issued in PCT Application No. PCT/US2016/061792", dated Apr. 25, 2017, 7 Pages.

* cited by examiner

ENHANCED MODE CONTROL OF CACHED DATA

BACKGROUND

Network-based services often require large-scale data storage. For example, Internet email services store large quantities of data in user inboxes, each user inbox itself including a sizable quantity of data. In another example, a web service may store data (e.g., images, text, etc.) to be served to client devices requesting to view a web page. This large-scale data storage is often implemented in datacenters comprised of storage devices.

Accordingly, the network-based services are configured to receive, and respond to, client requests. That is, a client device can access the network-based services to interact with data (e.g., data objects) stored in the storage devices. For instance, a client device can request to retrieve data from a storage device. Or the client device can request to have data already stored in a storage device updated (e.g., an updated document).

To handle a large number of client requests, the network-based services typically use a series of cache servers (e.g., frontend servers) configured between the client device and the storage devices. A cache server is configured to temporarily cache some of the data stored in the storage devices to improve performance of the network-based services by reducing a number of communications between the cache server and a storage device. However, many problems associated with efficiently and reliably updating the cache of a cache server can occur.

SUMMARY

Described herein are techniques and systems for controlling a broadcast mode and a timer mode to update data stored in respective caches of multiple cache servers. In some configurations, a cache server can store and distribute data to client devices. When the cache server is operating in the broadcast mode, the cache server receives an indication of a data update from the broadcast server that is tasked with notifying the multiple cache servers of the data update. Stated another way, a network-based service can use the broadcast server to ensure that each cache server is configured to store in the cache, or fetch for the cache, data that is consistent with corresponding data stored in a storage device. Consequently, the cache servers are synchronized (e.g., they store the same data in their caches).

When a cache server is operating in the timer mode, the cache server is configured to update its cache periodically and without the use of, or reliance upon, a broadcast server. For instance, data stored in the cache of a cache server can become invalid after a predetermined cache time period (e.g., five minutes) has elapsed, and once the cached data becomes invalid, the cache server is configured to completely empty the data in its cache and fetch new data, regardless of whether or not any of the cached data has recently been updated (e.g., via a client request to update data stored in a storage device).

As described herein, a cache server is configured to operate in the broadcast mode based on a determination that the broadcast server is operating as expected. The broadcast server is operating as expected if it is capable of broadcasting (e.g., sending) messages and/or data updates to the multiple cache servers. For example, the broadcast server can be configured to broadcast an "alive" message informing the cache servers that the broadcast server is online and operating as expected and so that the cache servers are provided with data indicating that the broadcast server is not "dead" and/or offline (e.g., incapable of broadcasting). The cache server determines that the broadcast server is operating as expected as long as a message and/or a data update has been received from the broadcast server within a predetermined broadcast time period.

In contrast to the broadcast mode, a cache server is configured to operate in the timer mode based on a determination that the broadcast server is not operating as expected. The broadcast server is not operating as expected if it is incapable of broadcasting messages and/or data updates to the multiple cache servers. For example, the broadcast server may be dead due to a power failure, a software crash, or a hardware crash. Or, the broadcast server may be offline due to network connectivity issues. In some instances, the broadcast mode can be referred to as a default or a preferred mode of operation for a cache server and the timer mode can be referred to as a backup or an alternative mode of operation for the cache server.

Consequently, the technique and systems described herein enable a cache server to determine whether a broadcast server is operating as expected, and if not, to switch from the broadcast mode to the timer mode.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Figure 1:
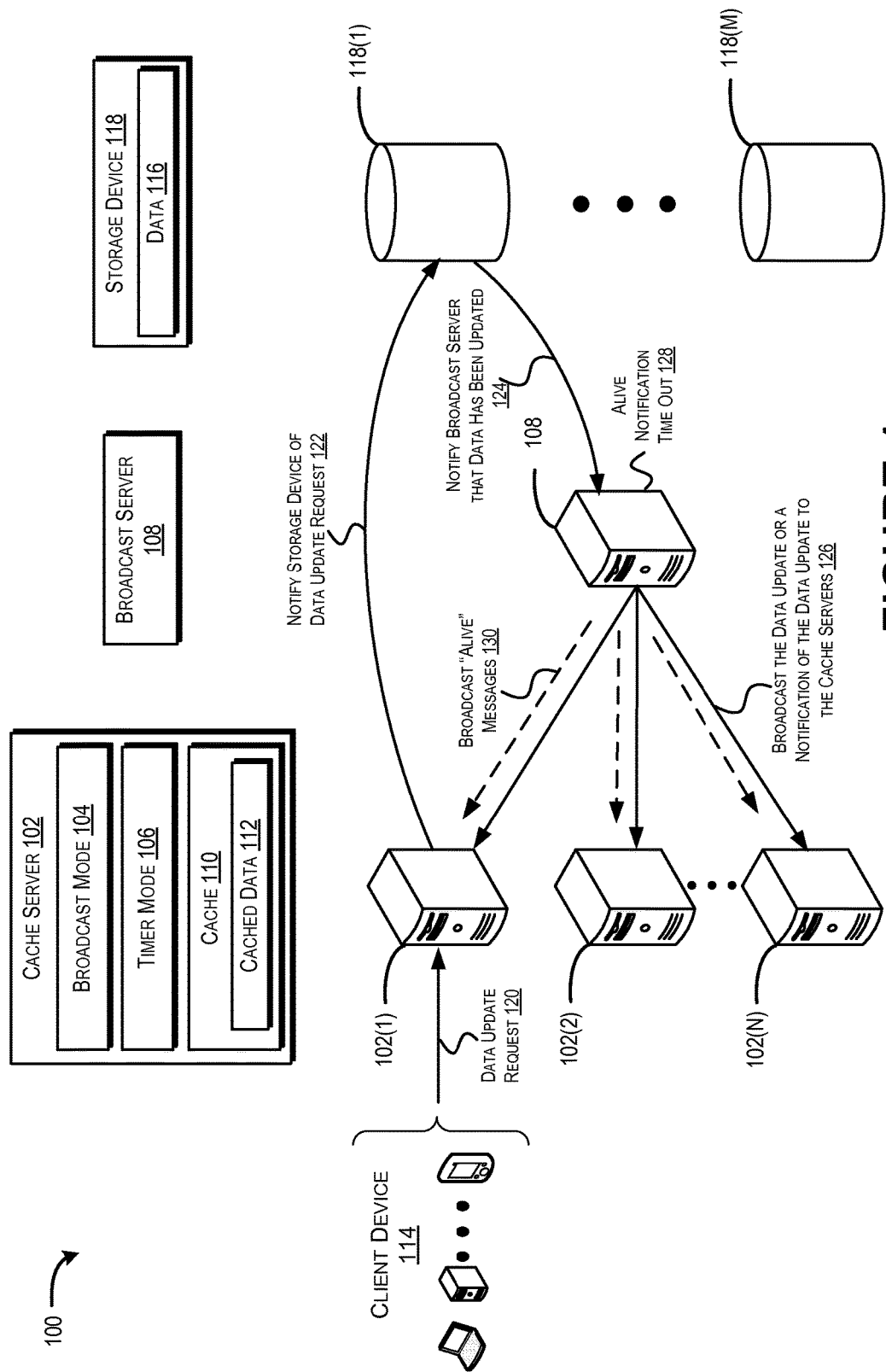
FIG. 1 illustrates an example environment in which cache servers are individually configured to operate in a broadcast mode based on a determination that a broadcast server is operating as expected and is capable of broadcasting.

The techniques and systems described herein enable a device that caches data (referred to herein as a cache server) to switch between a broadcast mode and a timer mode based on whether or not another device (referred to herein as a broadcast server) that is configured to broadcast data updates is operating as expected. In various examples, the broadcast server is configured to interact with cache servers and storage devices to ensure that cached data stored at the cache server is updated appropriately (e.g., the broadcast server can be configured between the cache servers and the storage devices). Accordingly, the data updates broadcast by the broadcast server are associated with, or directed to, data stored in a cache of a cache server.

The broadcast server is operating as expected when the broadcast server is "alive" and online and is capable of broadcasting (e.g., the broadcast server is not "dead" or offline). While operating in the broadcast mode, a cache server is configured to update a portion of the data stored in its cache in response to receiving a data update from the broadcast server. For example, the data update identifies the portion of the data and the cache server can mark the portion of data as being invalid so that updated data can be fetched in response to a client request for the portion of data marked as invalid (e.g., the cache server provides new fetched cache data instead of the invalid cache data). While operating in the timer mode, a cache server is configured to update data stored in its cache in response to a predetermined cache time period elapsing. In the timer mode, the cache server uses a timer to determine when the predetermined cache time period elapses, and therefore, the cache server does not rely on the broadcast server (e.g., a dead or offline broadcast server) to implement a data update.

In various implementations described herein, the broadcast mode is the default or the preferred mode and the cache server is configured to operate in the broadcast mode as long as the broadcast server is capable of broadcasting. For instance, the broadcast server is configured to continually send messages and/or data updates to a cache server that is registered to receive (e.g., "listen" for) the broadcasts. Thus, as long as the cache server continues to receive the messages and/or the data updates from the broadcast server, then the cache server continues to operate in the broadcast mode based on knowledge that that the broadcast server is alive, online, and operating as expected. However, in instances in which the broadcast server dies or goes offline (e.g., due to a power failure, a software crash, a hardware crash, network connectivity issues, etc.) and the cache server has not received a message or a data update from the broadcast server within a predetermined broadcast time period, the cache server is configured to switch from the broadcast mode to the timer mode based on a determination that the broadcast server is likely dead or offline. During operation in the timer mode, the cache server updates data stored in its cache without using the broadcast server since the broadcast server is incapable of broadcasting.

The broadcast mode is the default or the preferred mode because it uses less resources and improves cache consistency (e.g., processing power, network bandwidth, etc.) to update data in the cache of the cache server. For example, a data update broadcast by the broadcast server applies to, and identifies, a specific portion of data in the cache for which corresponding data in a storage device has been recently updated (e.g., in response to a client request). Data stored in the cache of a cache server for which corresponding data in a storage device has not been recently updated is not associated with, or identified by, the data update broadcast by the broadcast server. In contrast, while in the timer mode, the cache server is configured to completely invalidate (e.g., empty, clean, remove, etc.) all the data in its cache after a predetermined cache time period has elapsed (e.g., every two minutes, every five minutes, every fifteen minutes, every hour, etc.). This includes invalidating and replacing data for which corresponding data stored in a storage device has not recently been updated. The cache server can then fetch new data. Consequently, in the timer mode, extra resources are consumed to fetch new data for the cache of a cache server, which is the exact same data that was previously invalidated (e.g., data that has not recently been changed in a storage device).

Additionally, the broadcast mode is the default or the preferred mode because data stored in the cache of the cache server can be updated more efficiently (e.g., in response to a client request) because the cache server is not configured to wait until the end of the predetermined cache time period to update data. For instance, if a client requests to update data at the beginning of the predetermined cache time period (e.g., the first minute of a ten minute time period), the cache server will not update its cache to reflect the client request until the end of the predetermined cache time period (e.g., after the ten minutes have elapsed). However, in the broadcast mode, the broadcast server can broadcast a data update to a cache server immediately after a storage device updates the data (e.g., in response to a client request).

Accordingly, the broadcast mode is the default or the preferred mode. However, since the broadcast server is susceptible to an event that causes it to not operate as expected (e.g., the broadcast server could be dead or offline), the broadcast server may become incapable of broadcasting data updates. For example, the broadcast server can be incapable of broadcasting data updates due to a power failure, a software crash, a hardware crash, or network connectivity issues. Therefore, the systems and techniques described herein are configured to switch operation of a cache server from the broadcast mode (e.g., a default or a preferred mode) to a timer mode (e.g., an alternative or a backup mode) so that the cache server is still capable of updating the data in its cache without relying on, or using, the broadcast server. When the broadcast server returns to a state where it operates as expected and is capable of broadcasting, the systems and techniques described herein are configured to switch operation of the cache server from the timer mode back to the broadcast mode.

FIG. 1 illustrates an example environment 100 in which individual ones of multiple cache servers 102(1) . . . 102(N) are configured to operate in a broadcast mode 104 instead of a timer mode 106 based on a determination that a broadcast server 108 is operating as expected and is capable of broadcasting. As described above, a cache server 102 includes a cache 110 that stores cached data 112. In various examples, the cache server 102 stores the cached data 112 for interaction with a client device 114 (e.g., receives data from the client device 114, sends data to the client device 114, etc.). The cached data 112 typically includes a subset of a larger amount of data 116 stored in at least one of various storage devices 118(1) . . . 118(M). For instance, a cache server 102 can be a server (e.g., a network server, a frontend server, a proxy server, etc.), within a network-based service, that stores Web pages, document, emails or other Internet or network-accessible content locally. The cached data 112 can comprise content that has previously been requested, and thus, can be placed in temporary storage (e.g., the cache 110) so that content access speeds are increased and demand on bandwidth within the network-based storage system is reduced. The cached data 112 can alternatively comprise content that has been provided by a client device 114. The storage devices 118(1) . . . 118(M) can be configured as backend storage, within the network-based storage system, that permanently stores the data 116.

In various examples, the client device 114 can send a data update request to a cache server 102(1) (as referenced by 120). For instance, the cache server 102(1) can intercept and act upon a client request on behalf of the network-based storage system. In response to receiving the data update request from the client device 114, the cache server 102(1) notifies a storage device 118(1) that stores corresponding data of the data update request (as referenced by 122). For instance, the cache server 102(1) can use an identifier (ID) in the update request, and that is associated with the data to be updated, to locate a storage device 118(1) and to pass the requested data update to the storage device 118(1) so that the storage device 118(1) updates the corresponding data (e.g., a user email inbox, a document, a comment on an article posted on a Web page, etc.) in response to the data update request received from the client device 114. After the storage device 118(1) updates the corresponding data successfully, the storage device 118(1) notifies the broadcast server 108 that the data has been updated (as referenced by 124). After the broadcast server 108 receives the notification from the storage device 118(1) that the data has been updated, the broadcast server 108 broadcasts (e.g., sends) the data update or a notification of a data update to the cache servers 102(1) . . . 102(N) (as referenced by 126 and the solid lines between the cache servers and the broadcast server) so that the cache servers 102(1) . . . 102(N) can update the cached data 112 stored in their respective caches 110. Consequently, the cached data 112, and in particular, the data being updated, is consistent across the cache servers 102(1) . . . 102(N).

In various examples, the broadcast server 108 can broadcast a notification of the data update that contains a unique identifier associated with the cache data to be updated. The notification can be associated with an instruction to invalidate (e.g., delete, clean, empty, etc.) the identified data. Based on the unique identifier, a cache server 102(1) can mark the associated cache data as being invalid, and based on the mark, the cache server 102(1) is configured to fetch the updated data for the cache 110 in response to a request for the data from a client device 114. For instance, the cache server 102(1) (e.g., at a subsequent time) determines that the requested data in the cache has been marked as invalid, or has been deleted, and then the cache server 102(1) can fetch updated data to respond to the request from the client.

As described above, the cache servers 102(1) . . . 102(N) are registered servers that are configured to listen for broadcasts from the broadcast server 108. The cache servers 102(1) . . . 102(N) are configured to make a determination that the broadcast server 108 is alive, online, and operating as expected as long as a data update is received (e.g., is broadcast) at the cache servers 102(1) . . . 102(N) within a predetermined broadcast time period. For example, every time a cache server 102 receives a data update broadcast by the broadcast server 108, the cache server 102 restarts a timer to track whether or not the predetermined broadcast time period has elapsed without receiving another data update broadcast by the broadcast server 108.

Since there may be situations in which the broadcast server 108 is operating as expected but in which there is not a recent data update to handle and broadcast, the broadcast server 108 is configured to inform the cache servers 102(1) . . . 102(N) that it still has broadcasting capabilities before the predetermined broadcast time period elapses. Accordingly, the broadcast server 108 is configured to use (e.g., start) a timer to determine when a predetermined "alive" notification time period has elapsed (as referenced by 128). In various examples, the predetermined alive notification time period is less than the predetermined broadcast time period associated with (e.g., tracked by) a cache server 102 to ensure that the cache server 102 does not mistakenly switch to the timer mode 106 in situations where the broadcast server 108 is still operating as expected. For instance, the predetermined alive notification time period associated with the broadcast server 108 can be half the predetermined broadcast time period associated with the cache servers 102(1) . . . 102(N) (e.g., "two and half" minutes compared to "five" minutes). Or, the predetermined alive notification time period associated with the broadcast server 108 can be eighty percent of the predetermined broadcast time period associated with the cache servers 102(1) . . . 102(N) (e.g., "four" minutes compared to "five" minutes).

Upon expiration of the predetermined alive notification time period, the broadcast server 108 is configured to broadcast an alive message, which is a message dedicated to informing the cache servers 102(1) . . . 102(N) that the broadcast server is still capable of broadcasting (e.g., is not dead or offline) even though a data update has not been broadcast recently (as referenced by 130 and the dotted lines between the cache servers and the broadcast server). In various examples, the alive message broadcast by the broadcast server 108 can be a single packet sent to each cache server 102, and that is limited in size so that it does not consume large amounts of bandwidth. To this end, if the broadcast server 108 is operating as expected and is capable of broadcasting data updates, then the cache servers 102(1) . . . 102(N) will be aware of the broadcasting capabilities of the broadcast server 108, before the predetermined broadcast time period elapses, via either (i) the reception of an actual broadcasted data update or a notification of a data update (as referenced by 126) or (ii) the reception of a broadcasted alive message (as referenced by 130).

Figure 2:
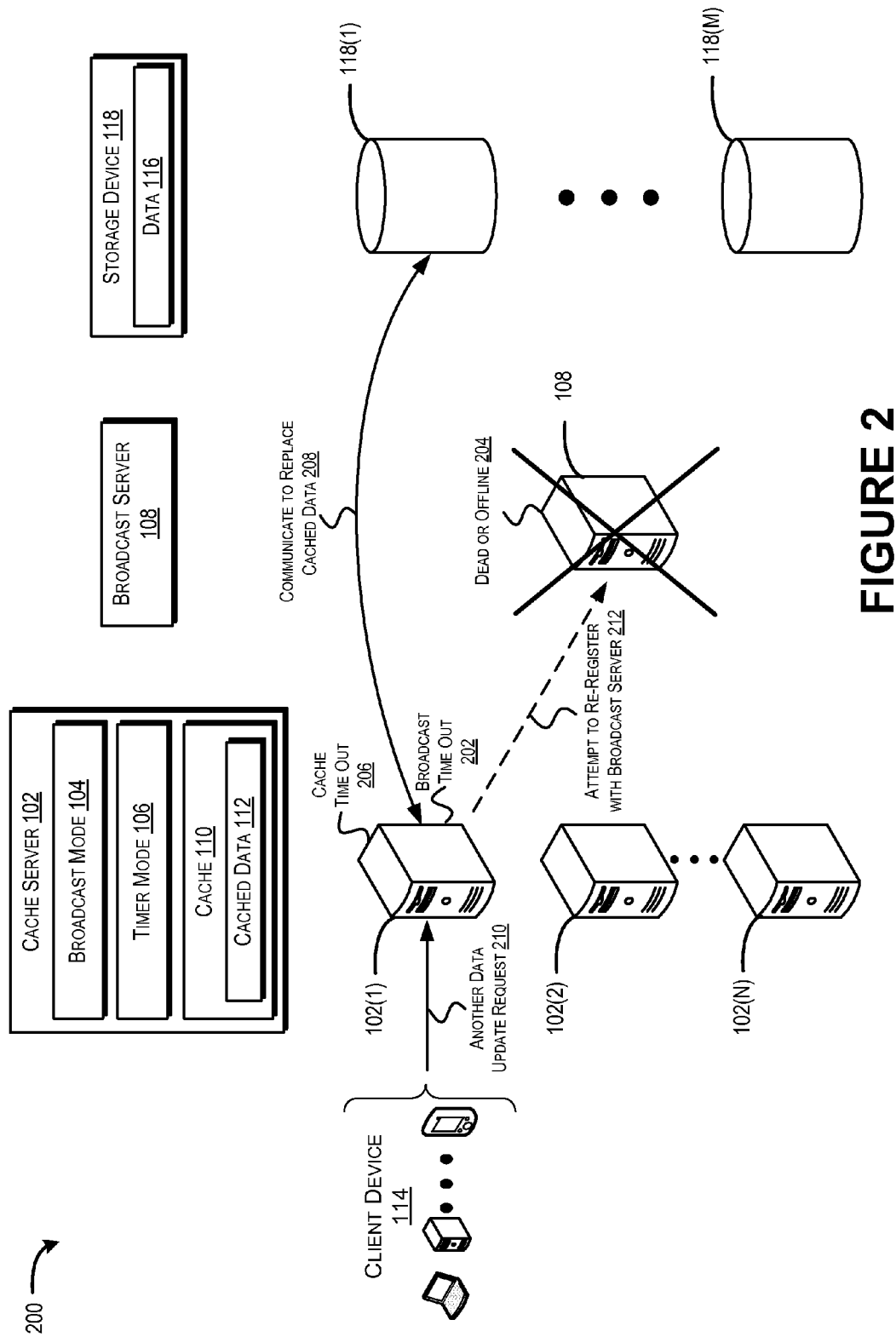
FIG. 2 illustrates an example environment in which cache servers are individually configured to operate in a timer mode based on a determination that a broadcast server is not operating as expected and is incapable of broadcasting.

FIG. 2 illustrates an example environment 200 in which individual ones of the multiple cache servers 102(1) . . . 102(N) are configured to operate in the timer mode 106 instead of the broadcast mode 104 based on a determination that the broadcast server 108 is not operating as expected and is incapable of broadcasting.

As described above, after receiving a previous data update (e.g., as referenced by 126 in FIG. 1), the cache server 102(1) is configured to start a timer to determine whether the predetermined broadcast time period (e.g., five minutes, ten minutes, fifteen minutes, etc.) elapses without receiving either (i) an alive message broadcast by the broadcast server 108 or (ii) another data update or a notification of a data update broadcast by the broadcast server 108. In an event the cache sever 102(1) determines that the predetermined broadcast time period elapses without receiving the alive message and without receiving another data update (as referenced by 202), the cache server 102(1) switches from the broadcast mode 104 to the timer mode 106 based on the determination (e.g., assumption) that the broadcast server 108 is not operating as expected and is incapable of broadcasting due to a loss of power or network connectivity issues (as referenced by 204 along with the "X" over the broadcast server 108). After switching to timer mode 106, the cache server 102(1) is further configured to start the timer to determine that a predetermined cache time period (e.g., three minutes, five minutes, seven minutes, ten minutes, etc.) has elapsed (as referenced by 206). As described above, while in the timer mode 106, the cache server 102(1) uses the predetermined cache time period to determine when to invalidate the cached data 112. While operating in the timer mode 106, the cache server 102(1) is configured to communicate directly with storage devices 118(1) . . . 118(M) to fetch new cached data 112 in response to the predetermined cache time period elapsing (as referenced by 208) to ensure that the cached data 112 is updated and accurately reflects the corresponding data stored in the storage devices 118(1) . . . 118(M). As illustrated in FIG. 2, this communication between the cache server 102(1) and the storage devices 118(1) . . . 118(M) is implemented without using the broadcast server 108.

In various examples, the cache server 102(1) can receive another data update request 210 while operating in the timer mode 106 (e.g., a data update request subsequently received after the data update request in FIG. 1). The cache server 102(1) can be configured to wait until the predetermined cache time period elapses (as referenced by 206) before communicating the another data update request to the storage device 118(1) (as referenced by 208). In some instances, the cache server 102(1) is configured to not update the cached data 112 at the time the another update request is received from the client device 114, but rather, the cache server 102(1) will wait until the storage device 118(1) informs each cache server 102(1) . . . 102(N) of the data update to update the cached data 112. This ensures that the cached data 112 stored locally at each server 102(1) . . . 102(N) is consistent and the data updates are consistently applied (e.g., without relying on a dead or offline broadcast server 108). Consequently, each cache server 102(1) . . . 102(N) provides the same content (e.g., a Web page, a document, etc.) in response to client device requests to access the content over a network.

After the cache server 102(1) has switched from the broadcast mode 104 to the timer mode 106, the cache server 102(1) is configured to attempt to re-register with the broadcast server 108 (as referenced by 212). The cache server 102(1) can make the attempt periodically (e.g., every minute, every three minutes, every five minutes, etc.) so that if the last attempt is unsuccessful due to the broadcast server 108 still being dead or offline, then the cache server 102(1) continues to try to re-register as a listening server. Consequently, as soon as the broadcast server 108 returns to an alive and an online state in which it is capable of broadcasting, the cache server 102(1) can successfully re-register with the broadcast server 108 and switch from the timer mode 106 back to the broadcast mode 104 (e.g., the default or the preferred mode).

In various implementations, each cache server 102(1) . . . 102(N) described above with respect to FIG. 1 and/or FIG. 2 may run its own timer to determine if and when the predetermined broadcast time period and/or the predetermined cache time period elapses. However, in alternative implementations, an individual time management device (e.g., one of the cache servers such as cache server 102(1) or a separate device) can manage the timing for a group of cache servers (e.g., cache servers 102(1) . . . 102(N)) and inform each cache server in the group if the predetermined broadcast time period and/or the predetermined cache time period elapses so the appropriate actions can then be implemented.

In various examples, a cache server 102(1) may operate different timers and/or different predetermined cache time periods for different data entries (e.g., a separate timer for separate cache data or a single time for all the cache data).

Figure 3:
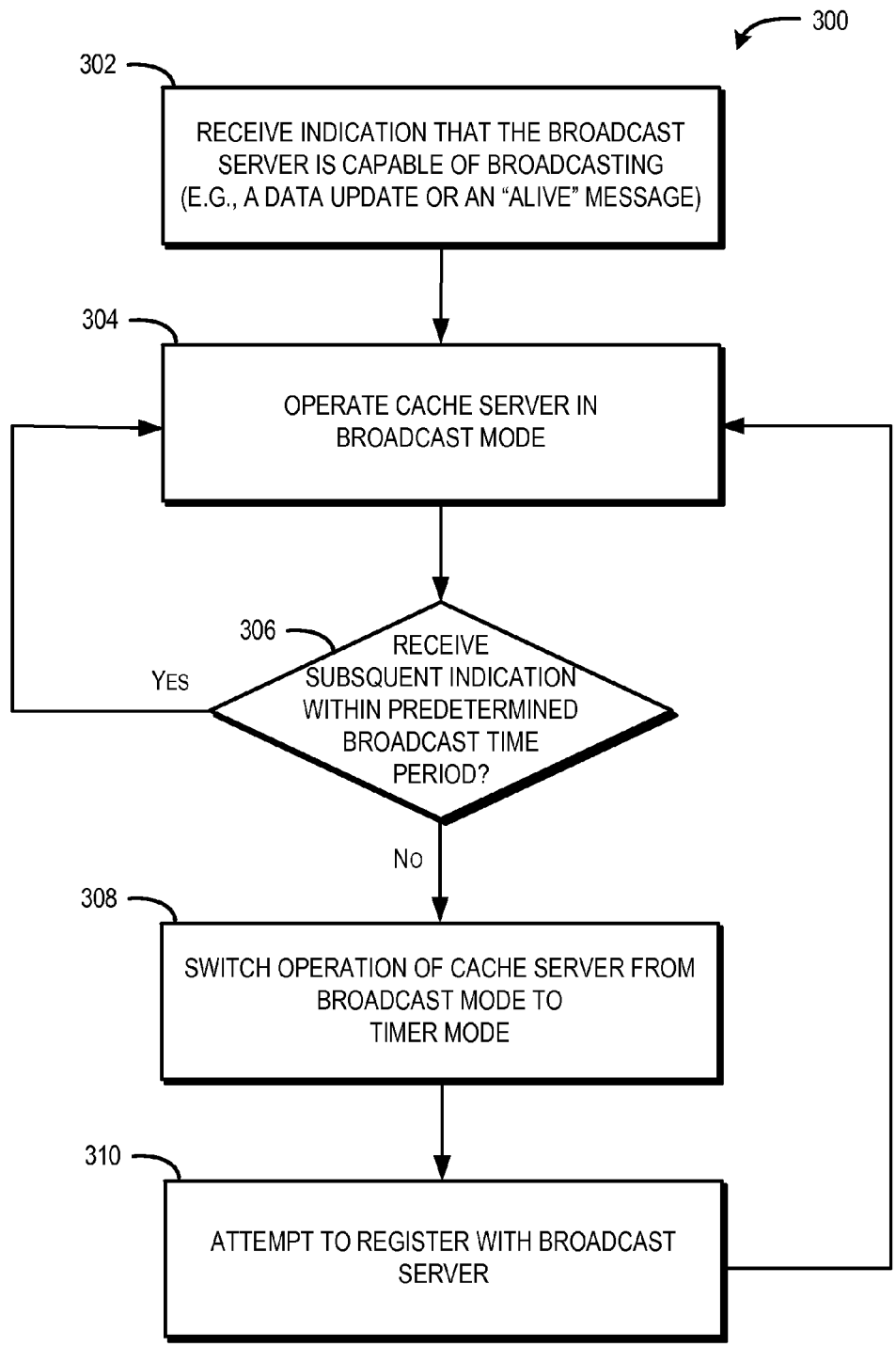
FIG. 3 illustrates a flow diagram of an example process that switches operation of a cache server from a broadcast mode to a timer mode.
Figure 5:
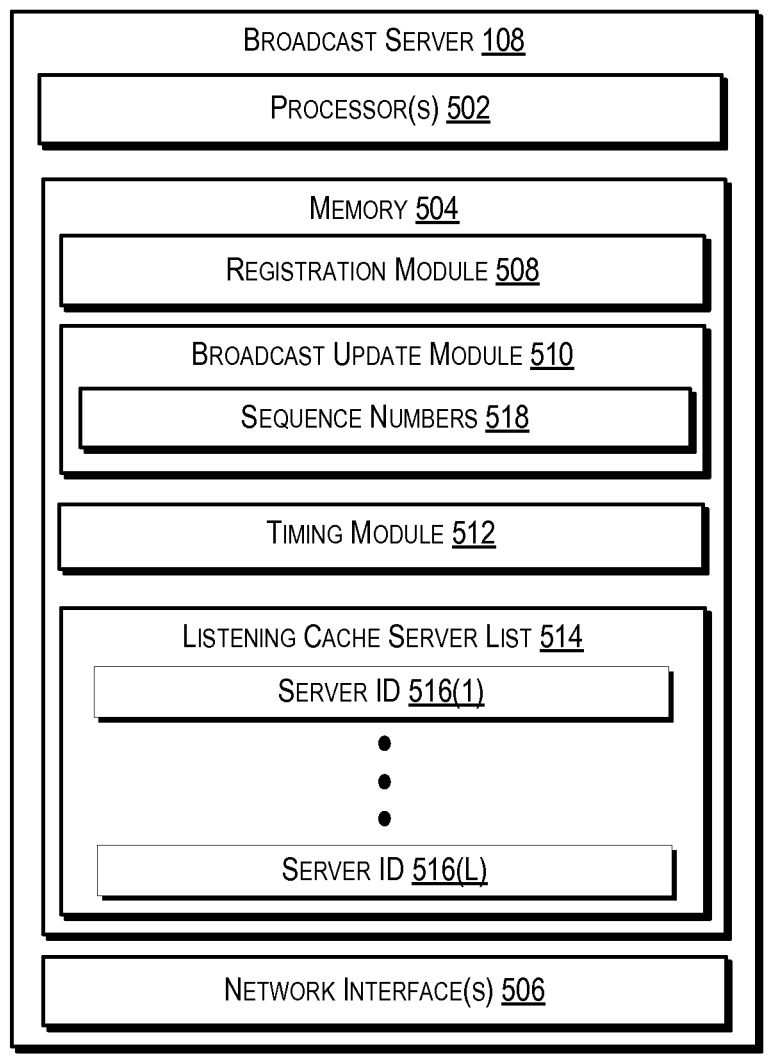
FIG. 5 is a schematic diagram illustrating components of an example broadcast server.
Figure 6:
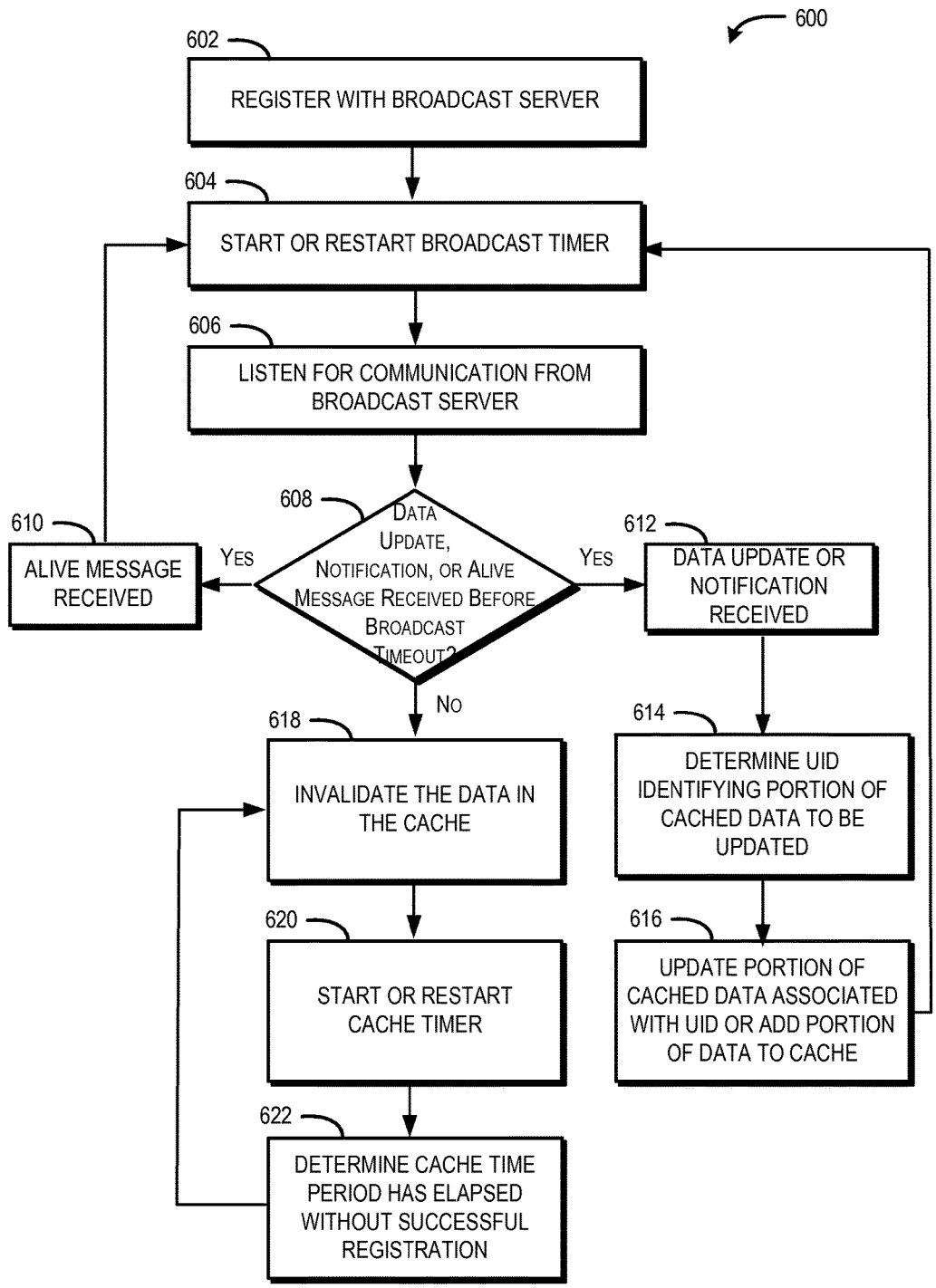
FIG. 6 illustrates a flow diagram of an example process that uses a timer to switch operation of a cache server from a broadcast mode to a timer mode and to update data stored in a cache of the cache server.
Figure 7A:
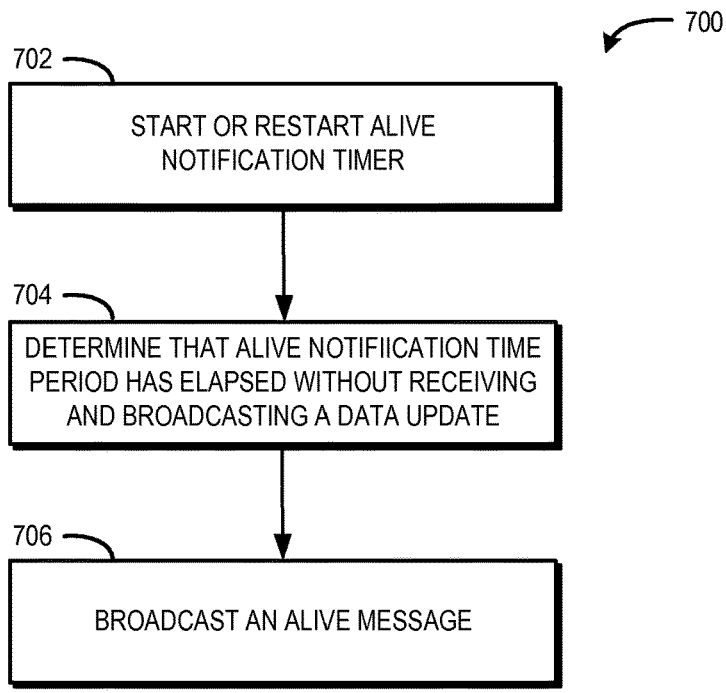
FIG. 7A illustrates a flow diagram of an example process that broadcasts a message to cache servers that are configured to listen to a broadcast server, the message indicating that the broadcast server is capable of broadcasting and/or the message informing the cache servers of the broadcast capability of the broadcast server.
Figure 7B:
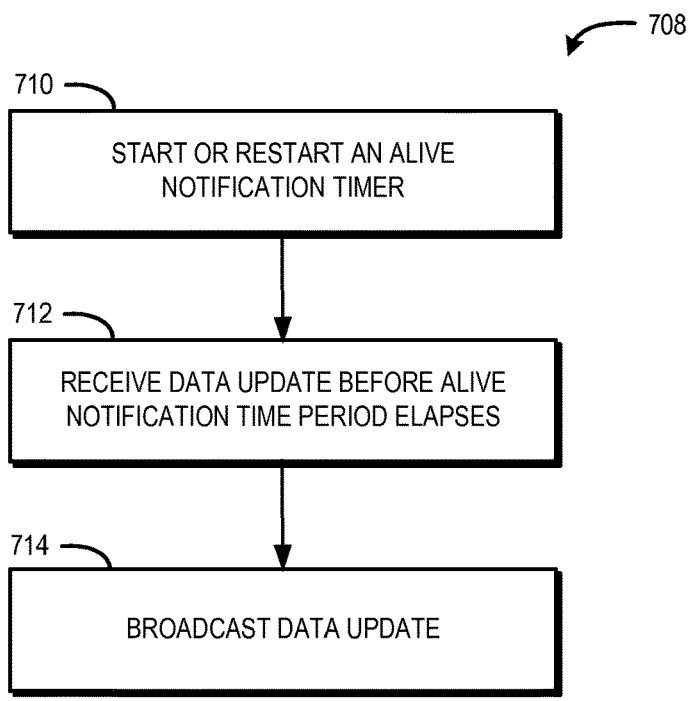
FIG. 7B illustrates a flow diagram of an example process that broadcasts a data update or a notification of a data update to cache servers that are configured to listen to a broadcast server, the data update indicating that the broadcast server is capable of broadcasting.
Figure 8:
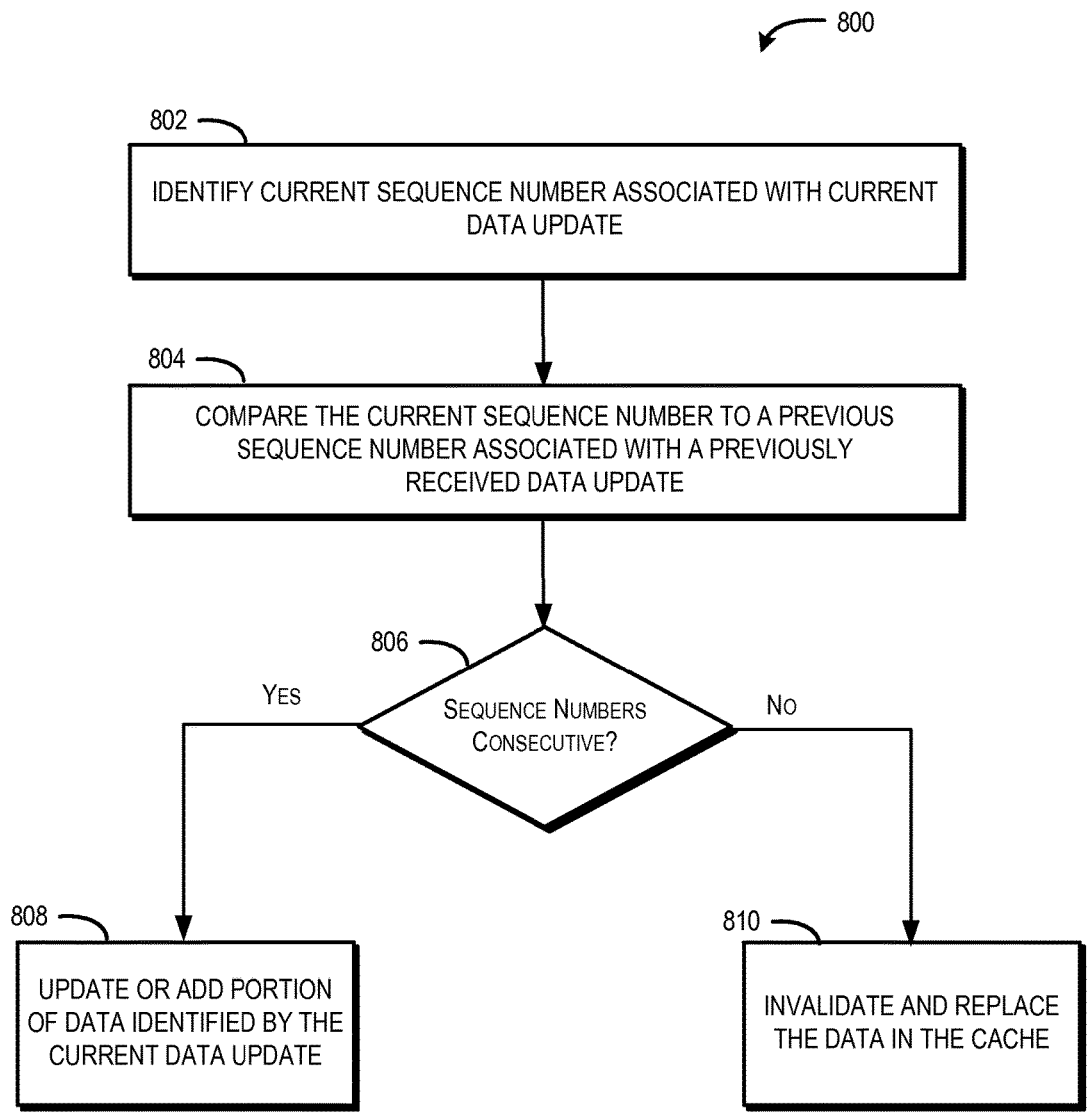
FIG. 8 illustrates a flow diagram of an example process that uses sequence numbers to update data stored in a cache of a cache server.

FIG. 3, as well as FIGS. 6-8, individually illustrate an example process for employing the techniques described herein. For ease of illustration, the example processes are described as being performed in the environment 100 of FIG. 1 and/or the environment 200 of FIG. 2. Moreover, the example processes may be implemented by the cache server 102 described in further detail with respect to FIG. 4 and/or the broadcast server 108 described in further detail with respect to FIG. 5. However, the example processes can be performed in other environments and by other devices as well. The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

FIG. 3 illustrates a flow diagram of an example process 300 that switches operation of a cache server (e.g., one of cache servers 102(1) . . . 102(N)) from a broadcast mode 104 to a timer mode 106.

At 302, the cache server 102 receives an indication that the broadcast server 108 is capable of broadcasting. For example, the cache server 102 can receive a data update broadcast by the broadcast server 108 or a notification of a data update broadcast by the broadcast server 108 (as described with respect to reference 126 in FIG. 1). In another example, the cache server 102 can receive an alive message broadcast by the broadcast server 108 (as described with respect to reference 130 in FIG. 1).

At 304, the cache server 102 operates, or continues to operate, in the broadcast mode 104 based on receiving the indication. As described above, while in the broadcast mode 104, the cache server 102 is configured to update a portion of data stored in its cache 110 in response to receiving a data update broadcast by the broadcast server 108 or a notification of a data update broadcast by the broadcast server 108 (e.g., the broadcast server 108 is tasked with notifying multiple cache servers of the data update after the data has been updated at a storage device 118(1)). The data update broadcast by the broadcast server 108 identifies the portion of data in the cache 110 to be updated and/or provides the updated data.

At 306, the cache server 102 listens for any subsequent indications broadcast by the broadcast server 108 and determines whether or not a subsequent indication is received at the cache server 108 within a predetermined broadcast time period.

If the answer at 306 is "yes" (the cache server 102 has received a data update, a notification of a data update, or an alive message before the predetermined broadcast time period elapses), then the process returns to operation 304 and the cache server 102 continues to operate in the broadcast mode 104 and the cache server 102 re-starts the predetermined broadcast time period.

If the answer at 306 is "no" (the cache server 102 has not received a data update, a notification of a data update, or an alive message before the predetermined broadcast time period elapses), then the process moves to 308 and the cache server 102 switches from operating in the broadcast mode 104 to operating in the timer mode 106. As described above, while operating in the timer mode 106, the cache server 102 is configured to update its cache periodically and without the use of, or reliance upon, the broadcast server 108. For instance, data stored in the cache 110 of a cache server 102 becomes invalid after a predetermined cache time period has elapsed, and once the cached data 112 becomes invalid, the cache server 102 is configured to completely empty all the data 112 in its cache 110 and fetch new data.

At 310, the cache server 102, while operating in the timer mode 106, attempts to register (e.g., re-register) with the broadcast server 108 so that it is able to switch from the timer mode 106 back to the broadcast mode 104 once the cache server 102 knows, or has determined that, the broadcast server 108 has returned to a state where it is alive, online, and capable of broadcasting (e.g., the broadcast server 108 can acknowledge the attempt and/or begin broadcasting data updates and/or alive messages). Operation 310 may be repeated by the cache server 102 until a successful attempt occurs. If a successful attempt occurs, the process can return to operation 304 (e.g., where the cache server switches from the timer mode 106 back to the broadcast mode 104).

Figure 4:
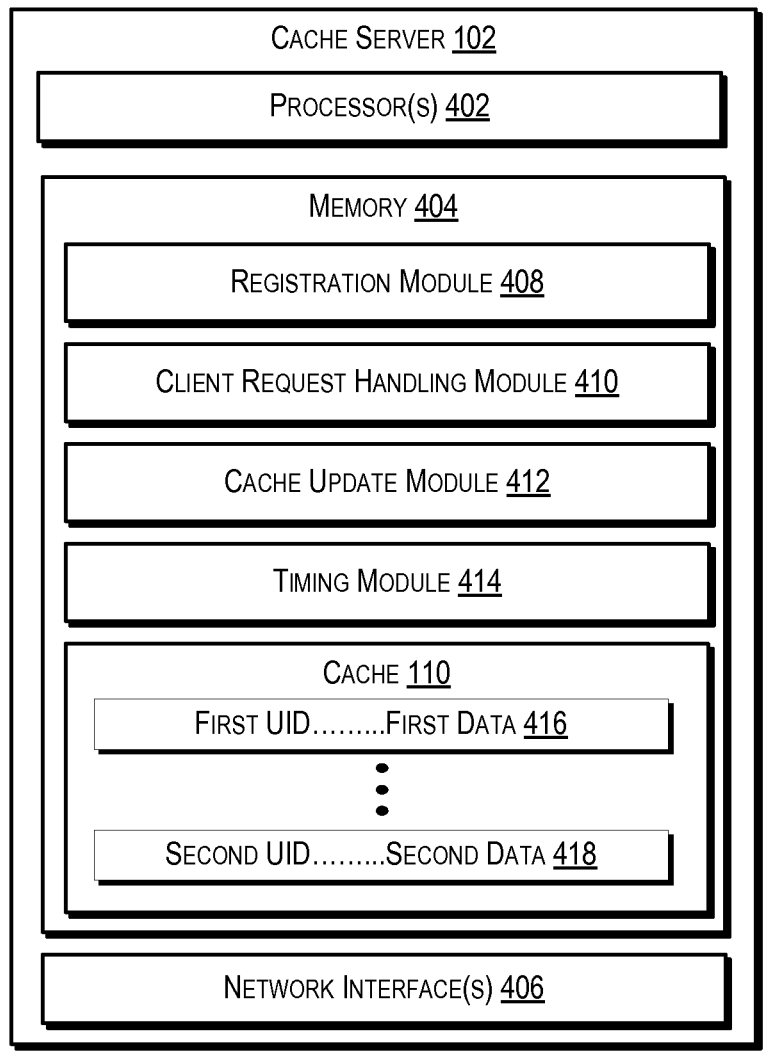
FIG. 4 is a schematic diagram illustrating components of an example cache server.

FIG. 4 is a schematic diagram illustrating components of an example cache server 102. The cache server 102 comprises a device that can be part of a network-based data storage system (e.g., a datacenter, a server farm, cloud resources, etc.), and thus, the device can be a server, a computer, or another device configured to connect to the broadcast server 108 and/or to the storage devices 118(1) . . . 118(M) via one or more wired and/or wireless networks. A network can comprise a wide area network (WAN), a local area network (LAN), a personal area network (PAN), a network specific to a datacenter (e.g., an Intranet, a storage area network (SAN)), etc. A network can also comprise switches that connect various devices (e.g., the servers and storage devices illustrated in FIG. 1 and/or FIG. 2) to routers and/or other devices that can act as bridges between data networks. Communications between devices (e.g., via the switches and/or routers) can utilize any sort of communication protocol known in the art for sending and receiving information and/or messages, such as the Transmission Control Protocol/Internet Protocol (TCP/IP) and/or the User Datagram Protocol (UDP).

The cache server 102 can include one or more processor(s) 402 and memory 404, as well as network interface(s) 406 so that the cache server can communicate with the broadcast server 108, the storage devices 118(1) . . . 118(M), and the client device 114 (e.g., to handle a request received over the Internet). The processor(s) 402 can be a single processing unit or a number of units, each of which could include multiple different processing units. The processor(s) 402 can include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 402 can be configured to fetch and execute computer-readable instructions stored in the memory 404.

The memory 404 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 404 can also include an operating system configured to manage hardware and services within and coupled to the cache server 102 for the benefit of other components and other devices. For instance, the memory 404 can include a registration module 408, a client request handling module 410, a cache update module 412, and a timing module 414. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules can be implemented in whole or in part by hardware (e.g., a specialized processing unit, etc.) to execute the described functions. In various implementations, the modules described herein in association with the cache server 102 can be executed across multiple devices.

Accordingly, the cache server 102 can be maintained and/or operated by a provider of network-based services and a network-based storage system. For example, the provider may provide a network accessible site (e.g., a Web page), email services, document services, or another type of information distribution platform (e.g., for mobile applications, etc.). Consequently, the cache server 102 is capable of handling requests from applications executing on many client devices (e.g., client device 114) and serving, in response, various content to the client devices that can be rendered on displays of the client devices. An application can be any sort of application, such as a word processing service, an email service, a browsing service (e.g., a process, a thread, or a routine of an application), that can make a request to store or retrieve data (e.g., a file) via a storage device 118(1). An individual storage device 118(1) can include: a machine (e.g., a server), a disk, a platter, or a sector. In some instances, storage device(s) can be arranged into a "rack" (e.g., a row) and/or a "grid" (e.g., configured within in a data center).

A client device 114 can be any device, including, without limitation, a personal computer, a laptop computer device, a desktop computer device, a portable digital assistant (PDA) device, a mobile phone device, a smartphone device, a tablet computer device, an electronic book (eBook) reader device, a set-top box device, a game console device, a smart television device, a wearable device (e.g., a smart watch, electronic "smart" glasses, a fitness tracker, etc.), or any other electronic device that can transmit/receive data over network(s). In some examples, a client device 114 can be a server, or other network-accessible device (e.g., positioned within a multi-layer configuration to handle requests from user devices).

The registration module 408 is configured to register the cache server 102 with the broadcast server 108. As described above, since the cache server 102 is configured to update a portion of data in its cache 110 via the broadcast mode 104 (e.g., the default or preferred mode), the cache server 102 registers as a listener to the broadcast server 108 so the broadcast server 108 knows the cache server relies on its broadcasts to process a data update. Additionally, after an initial registration, the registration module 408 is further configured to re-register the cache server 102 with the broadcast server 108, in response to an event where the broadcast server 108 dies or goes offline. The registration module 408 can implement a re-registration attempt periodically (e.g., every minute, every three minutes, every five minutes, etc.) so that if the last attempt is unsuccessful due to the broadcast server 108 still being dead or offline, then additional attempts can be made. Consequently, as soon as the broadcast server 108 returns to an alive and an online state in which it is capable of broadcasting, the registration module 408 is successfully able to re-register with the broadcast server 108 and switch from the timer mode 106 back to the broadcast mode 104 (e.g., the default or the preferred mode).

The client request handling module 410 is configured to handle data interaction requests received from a client device 114. In one example, the client device 114 requests to update data (e.g., the client device 114 provides new data to be stored in the cache 110 of the cache server 102 and/or to be stored in the storage device 118(1)). In response, the client request handling module 410 passes the request on to the storage device 118(1), as illustrated above with respect to FIG. 1 and/or FIG. 2. In another example, the client device 114 requests to retrieve data. In response, the client request handling module 410 can provide the requested data directly to the client device 114 if the requested data is already stored in the cache 110 of the cache server 102. Or, the client request handling module 410 can pass the request on to the storage device 118(1) so the requested data can be retrieved from the storage device (e.g., in an event the requested data is not already in the cache 110 of the cache).

The cache update module 412 is configured to update the cache 110 of the cache server 102 in accordance with the broadcast mode 104 (as described above with respect to FIG. 1) or in accordance with the timer mode 106 (as described above with respect to FIG. 2). Accordingly, the cache update module 412 operates in accordance with the timing module 414. The timing module 414 is configured to control a timer to determine if and when the predetermined broadcast time period elapses or the predetermined cache time period elapses. As described above, the cache update module 412 uses the predetermined broadcast time period to switch from the broadcast mode 104 of operation to the timer mode 106 of operation (e.g., if a data update or an alive message is not received from, or broadcast by, the broadcast server 108 prior to the predetermined broadcast time period elapsing). The cache update module 412 uses the predetermined cache time period while operating in the timer mode 106 to determine when the data in the cache 110 is to be invalidated and new data is to be fetched (e.g., all the data stored in its cache 110).

In various examples, the modules of the cache server 102 described above can use unique identifiers (UIDs), such as a global unique identifier (GUID), to identify different portions or pieces of data that are stored in the cache 110 and/or in the storage device 118(1) . . . 118(M). For instance, FIG. 4 illustrates a first portion of data with a first UID 416 and a second portion of data with a second UID 418, where the first and second portion of data are different and the first and second UIDs are different. Accordingly, data to be updated can be identified by each of the cache server 102, the broadcast server 108, and the storage device 118(1) (e.g., using a UID).

FIG. 5 is a schematic diagram illustrating components of an example broadcast server 108. The broadcast server 108 comprises a device that can be part of a network-based data storage system (e.g., a datacenter, a server farm, cloud resources, etc.), and thus, the device can be a server, a computer, or another device configured to connect to cache server 102(1) . . . 102(N) and/or to the storage devices 118(1) . . . 118(M) via one or more wired and/or wireless networks, as described above. Similar to the discussion above with respect to FIG. 4, the broadcast server 108 can include processor(s) 502, memory 504, and network interface(s) 506, and the broadcast server 108 can be maintained and/or operated by a provider of network-based services and a network-based storage system.

The memory 504 can include an operating system configured to manage hardware and services within and coupled to the broadcast server 108 for the benefit of other components and other devices. For instance, the memory can include a registration module 508, a broadcast update module 510, and a timing module 512.

The registration module 508 of the broadcast server 108 is configured to receive the registration requests or attempts from the cache server 102 (e.g., the registration module 408) and configure a listening cache server list 514. Accordingly, the listening cache server list 514 is configured to store and manage various server identifiers (IDs) 516(1) . . . 516(L) of cache servers (e.g., cache servers 102(1) . . . 102(N)) that have registered with the broadcast server 108 and that would like to receive the broadcasts of the broadcast server 108 (e.g., data updates and/or alive messages). Consequently, in response to receiving a registration request or attempt from a cache server 102, the registration module 508 is configured to add a server ID (e.g., 516(1)) to the listening cache server list 514.

The broadcast update module 510 is configured to receive a notification of a data update from a storage device (e.g., storage device 118(1)) and, in response, to broadcast (e.g., send) the data update or a notification of the data update to the cache servers 102(1) . . . 102(N) identified in the listening cache server list 514 (as referenced by 126 in FIG. 1) so that the cache servers 102(1) . . . 102(N) can update the cached data 112 stored in their respective caches 110. Consequently, the cached data 112 being updated is consistent across the cache servers 102(1) . . . 102(N).

The broadcast update module 510 is also configured to operate in accordance with the timing module 512 to broadcast alive messages, if appropriate. As described above, the timing module 512 is configured to control a timer to determine if and when the predetermined alive notification time period elapses without broadcasting a data update. If the predetermined alive notification time period elapses, the broadcast update module 510 broadcasts an alive message informing the cache servers 102(1) . . . 102(N) that the broadcast server 108 is still capable of broadcasting (e.g., is not dead or offline) even though a data update has not been broadcast recently (as referenced by 130 in FIG. 1).

In various examples, the data updates, the notifications of the data update, and/or the alive messages broadcast by the broadcast update module 510 over a period of time may be associated with sequence numbers 518 (e.g., 1, 2, 3, 4, 5, and so forth). In some implementations, the sequence numbers 518 can be used only in association with the data updates (e.g., not the alive messages). In other implementations, the sequence numbers 518 can be used in association with both the data updates and the alive messages. The sequence numbers 518 can be used by a cache server 102 to ensure that a broadcast (e.g., a data update) was not missed due to network connectivity issues, for example. For instance, in response to reception of a data update broadcast by the broadcast update module 510, the cache update module 412 can compare a current sequence number 518 associated with the current data update to a previous sequence number 518 associated with the previous data update. If the comparison fails to yield a consecutive number (e.g., the current sequence number minus the previous sequence number is greater than the value "one"), then the cache update module 412 can invalidate all the data in its cache 112 knowing, or assuming, that a broadcast (e.g., a data update) by the broadcast update module 510 was missed.

The cache server 102 and/or the broadcast server 108 can consider various factors when setting the predetermined time periods described herein. For instance, a type of data stored in in the data storage system and how often the data is typically updated and/or requested can be used to predetermine the time periods. In another example, an amount of bandwidth consumed by the communications can be used to predetermine the time periods. That is, larger time periods can reduce the bandwidth used to broadcast alive messages and/or to invalidate a cache 110 of a cache server 102.

FIG. 6 illustrates a flow diagram of an example process 600 that uses a timer to switch operation of a cache server 102 from a broadcast mode 104 to a timer mode 106 and to update data stored in a cache 110 of the cache server 102.

At 602, the registration module 408 of the cache server 102 registers with the broadcast server 108. Accordingly, the registration module 508 of the broadcast server 108 receives the registration request from the cache server 102 and adds the cache server to a list of cache servers registered as listening servers (e.g., the listening cache server list 514).

At 604, the timing module 414 starts a timer. The timer is started to determine whether a broadcast is received from the broadcast server 108 before a predetermined broadcast time period elapses, and therefore, the timer may be referred to as a broadcast timer.

At 606, the cache update module 412 listens for a communication from the broadcast server 108. For example, the cache update module 412 listens for a date update, a notification of a data update, or an alive message broadcast by the broadcast server 108.

At 608, the cache update module 412 determines whether a data update, a notification of a data update or an alive message has been received from the broadcast server 108 before the predetermined broadcast time period elapses.

If, at 610, an alive message has been received from the broadcast server 108 before the predetermined broadcast time period elapses (e.g., "yes" at decision 608), then the process returns to 604 where the timing module 414 restarts the broadcast timer.

If, at 612, a data update or a notification of a data update has been received from the broadcast server 108 before the predetermined broadcast time period elapses (e.g., also a "yes" at decision 608), then at 614, the cache update module 412 determines a UID associated with the data update. In various examples, the UID identifies a portion of data that is already cached and that is to be updated. In alternative examples, the UID identifies new data that is not yet cached and that is to be added to the cache 110 of a cache server 102.

At 616, the cache update module 412 updates the portion of cached data identified by the UID or adds the portion of data identified by the UID to the cache 110. In examples where the data update does not include the updated data (e.g., a notification), the cache update module 412 is configured to mark the identified data as being invalid and fetch the updated data (e.g., at a later time) in response to a client request associated with the cached data marked as being invalid.

If neither a data update, a notification of the data update, nor an alive message has been received from the broadcast server 108 before the predetermined broadcast time period elapses (e.g., a "no" at decision 608), then at 618, the cache update module 412 switches from broadcast mode 104 to a timer mode 106 and invalidates the data in its cache 110 (e.g., all the data).

At 620, the timing module 414 starts a timer. This timer is started to determine when a predetermined cache time period elapses, and therefore, this timer may be referred to as a cache timer.

At 622, the cache update module 412 determines that the predetermined cache time period has elapsed without the cache server 102 successfully re-registering with the broadcast server 108. Accordingly, the process returns to 618 where the cache update module 412, already operating in the timer mode 106, again invalidates the data in its cache 110.

FIG. 7A illustrates a flow diagram of an example process 700 that broadcasts an alive message to cache servers 102(1) . . . 102(N) that are configured to listen to a broadcast server 108, the alive message indicating that the broadcast server 108 is capable of broadcasting and/or the alive message informing the cache servers 102(1) . . . 102(N) of the broadcast capability of the broadcast server 108.

At 702, the timing module 512 starts or restarts a timer. The timer can be started or restarted in response to broadcasting a previous data update or a previous alive message. The timer is used to determine whether a predetermined alive notification time period elapses, and therefore, the timer may be referred to as an alive notification timer.

At 704, the broadcast update module 510 determines that the predetermined alive notification time period has elapsed without receiving and broadcasting a data update or a notification of a data update.

At 706, the broadcast update module 510 configures and broadcasts an alive message (e.g., which is sent to the listening cache servers 102(1) . . . 102(N)). As described above, the alive message is broadcast to make the listening cache servers 102(1) . . . 102(N) aware of the broadcasting capabilities of the broadcast server 108 and so that the cache servers 102(1) . . . 102(N) do not switch from the broadcast mode 104 (e.g., the default or preferred mode) to the timer mode 106 (e.g., the alternative or backup mode).

FIG. 7B illustrates a flow diagram of an example process 708 that broadcasts a data update or a notification of a data update to cache servers 102(1) . . . 102(N) that are configured to listen to a broadcast server 108, the data update or the notification of the data update indicating that the broadcast server 108 is capable of broadcasting.

At 710, the timing module 512 starts or restarts a timer. The timer can be started or restarted in response to broadcasting a previous data update or a previous alive message. The timer is used to determine whether a predetermined alive notification time period elapses, and therefore, the timer may be referred to as an alive notification timer.

At 712, the broadcast update module 510 receives a data update from a storage device 118(1) before the predetermined alive notification time period has elapsed.

At 714, the broadcast update module 510 configures and broadcasts the data update or a notification of a data update (e.g., which is sent to the listening cache servers 102(1) . . . 102(N)).

FIG. 8 illustrates a flow diagram of an example process 800 that uses sequence numbers to update data stored in a cache 110 of a cache server 102. In the example process 800, the broadcast update module 510 uses sequence numbers only in association with data updates (e.g., not alive messages).

At 802, the cache update module 412 receives a data update (e.g., a "current" data update) from the broadcast server 108 and identifies a current sequence number associated with the current data update.

At 804, the cache update module 412 compares the current sequence number to a previous sequence number associated with a previously received data update.

At 806, the cache update module 412 determined whether or not the current sequence number and the previous sequence number indicate consecutive data updates (e.g., the sequence numbers are consecutively ordered, or the current sequence number minus the previous sequence number is equal to the value "one").

If the answer at 806 is "yes", then the process proceeds to 808 where the cache update module 412 updates or adds a portion of data identified by the current data update.

If the answer at 806 is "no", then the process proceeds to 810 where the cache update module 412 invalidates the data in the cache 110 (e.g., all the data) because a data update broadcast by the broadcast server 108 was missed.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Example A, a device comprising: a cache storing data; a processor; a memory having instructions stored thereon that, when executed by the processor, cause the device to: determine that the broadcast server is capable of broadcasting; operate the device in a broadcast mode during which a portion of the data stored in the cache is updated in response to receiving a data update or a notification of the data update from the broadcast server, the data update or the notification of the data update identifying the portion of the data; determine that the broadcast server is incapable of broadcasting; and switch operation of the device from the broadcast mode to a timer mode during which another portion of the data stored in the cache is updated in response to a cache time period elapsing.

Example B, the device of Example A, wherein the instructions are further executable by the processor to determine that the broadcast server is capable of broadcasting in response to receiving a message from the broadcast server prior to a broadcast time period elapsing, the message informing the device that the broadcast server is capable of broadcasting.

Example C, the device of Example A, wherein the instructions are further executable by the processor to determine that the broadcast server is capable of broadcasting in response to receiving the data update or the notification of the data update from the broadcast server prior to a broadcast time period elapsing, the data update or the notification of the data update informing the device that the broadcast server is capable of broadcasting.

Example D, the device of any one of Example A through Example C, wherein the instructions are further executable by the processor to, in response to determining that the broadcast server is unreliable due to the incapability of broadcasting, communicate directly with one or more storage devices, while operating in the timer mode, to fetch new cache data in response to invalidating current cache data.

Example E, the device of any one of Example A through Example D, wherein the instructions are further executable by the processor to determine that the broadcast server is incapable of broadcasting in response to a broadcast time period elapsing without receiving, from the broadcast server, a message, the notification of the data update, or the data update.

Example F, the device of Example E, wherein the instructions are further executable by the processor to operate a timer useable to determine that the broadcast time period has elapsed.

Example G, the device of any one of Example A through Example F, wherein, while the device is operating in the broadcast mode, the instructions are further executable by the processor to invalidate the portion of the data in the cache identified by the data update or the notification of the data update and to not invalidate other portions the data in the cache that are not identified by the data update or the notification of the data update.

Example H, the device of any one of Example A through Example G, wherein the instructions are further executable by the processor to operate a timer useable to determine that the cache time period has elapsed with the device unsuccessfully registering with the broadcast server.

While Example A through Example H are described above with respect to a device, it is understood in the context of this document that the content of Example A through Example H may also be implemented via a system, computer storage media, and/or a method.

Example I, a method comprising: registering a cache server with a broadcast server so that the cache server is configured to receive broadcasts from the broadcast server; operating the cache server in a default mode of operation during which the cache server is configured to update a portion of data stored in a cache in response to receiving a data update or a notification of the data update from the broadcast server, the data update or the notification of the data update identifying the portion of the data stored in the cache; starting a timer at the cache server; receiving a message from the broadcast server prior to a predetermined broadcast time period elapsing, the message indicating that the broadcast server is capable of broadcasting; and continuing to operate the cache server in the default mode of operation based at least in part on receiving the message.

Example J, the method of Example I, further comprising: restarting the timer at the cache server in response to receiving the message; determining that the predetermined broadcast time period has elapsed without receiving one of (i) another message from the broadcast server or (ii) another data update or another notification of the another data update from the broadcast server; and switching operation of the cache server from the default mode of operation to a backup mode of operation during which the cache server is configured to update another portion of data stored in the cache in response to a predetermined cache time period elapsing.

Example K, the method of Example J, further comprising: re-registering the cache server with the broadcast server so that the cache server is again configured to receive broadcasts from the broadcast server; and switching operation of the cache server from the backup mode of operation back to the default mode of operation.

Example L, the method of Example J, wherein the cache server, in response to determining that the broadcast server is unreliable due to the incapability of broadcasting, communicates directly with one or more storage devices to invalidate all the data in the cache while operating in the backup mode of operation.

Example M, the method of any one of Example I through Example L, further comprising fetching, while the cache server operates in the default mode of operation, new cache data for the portion of the data in the cache identified by the data update or the notification of the data update and not fetching other portions of the data in the cache that are not identified by the data update or the notification of the data update.

While Example I through Example M are described above with respect to a method, it is understood in the context of this document that the content of Example I through Example M may also be implemented via a system, a device, and/or computer storage media.

Example N, a device comprising: a processor; and a memory having instructions stored thereon that, when executed by the processor, cause the device to: register a cache server as a listener for data updates to be broadcast by the device; receive a data update from a storage device; broadcast the data update or a notification of the data update for the cache server; determine that a predetermined notification time period has elapsed without broadcasting a subsequent data update or a subsequent notification of the data update for the cache server; and broadcast a message dedicated to informing the cache server that the device is capable of broadcasting.

Example O, the device of Example N, wherein the message causes the cache server to continue to operate in a broadcast mode of operation and to not switch from the broadcast mode of operation to a timer mode of operation.

Example P, the device of Example N or Example O, wherein the broadcast mode of operation relies upon the device to update data stored in a cache of the cache server.

Example Q, the device of Example O or Example P, wherein the timer mode of operation updates data stored in a cache of the cache server independent of using the device.

Example R, the device of any one of Example N through Example Q, wherein the instructions are further executable by the processor to re-register the cache server as the listener for the data updates or notifications of the data updates to be broadcast by the device in response to a failure of the device.

Example S, the device of any one of Example N through Example R, wherein the instructions are further executable by the processor to operate a timer useable to determine that the predetermined notification time period has elapsed.

Example T, the device of any one of Example N through Example S, wherein the predetermined notification time period is less than a predetermined broadcast time period useable by the cache server to switch from a broadcast mode of operation to a timer mode of operation, wherein: the broadcast mode of operation relies upon the device to update data stored in a cache of the cache server; and the timer mode of operation updates the data stored in the cache of the cache server without using the device.

While Example N through Example T are described above with respect to a device, it is understood in the context of this document that the content of Example A through Example H may also be implemented via a system, computer storage media, and/or a method.

CONCLUSION

In closing, although the various implementations may have been described in language specific to structural features and/or methodological acts, it is to be understood that the subject matter described is not necessarily limited to the specific features or acts described. Rather, the specific features and acts are disclosed as example forms of implementing the claimed subject matter.

What is claimed is:
1. A device comprising:
a cache storing data that is accessible to a plurality of client devices over a network;
a processor;
a memory having instructions stored thereon that, when executed by the processor, cause the device to:
determine that a broadcast server is in a first state in which the broadcast server is capable of broadcasting;
operate the device in a broadcast mode during which a portion of the data stored in the cache is updated in response to receiving a data update or a notification of the data update from the broadcast server, the data update or the notification of the data update identifying the portion of the data;

determine that the broadcast server has changed from the first state to a second state in which the broadcast server is incapable of broadcasting; and switch operation of the device from the broadcast mode to a timer mode during which another portion of the data stored in the cache is updated in response to a cache time period elapsing, wherein the device communicates directly with one or more storage devices to fetch new cache data useable to update the other portion of the data stored in the cache while operating in the timer mode.

2. The device of claim 1, wherein the instructions are further executable by the processor to determine that the broadcast server is in the first state in which the broadcast server is capable of broadcasting in response to receiving a message from the broadcast server prior to a broadcast time period elapsing, the message informing the device that the broadcast server is capable of broadcasting.

3. The device of claim 1, wherein the instructions are further executable by the processor to determine that the broadcast server is in the first state in which the broadcast server is capable of broadcasting in response to receiving the data update or the notification of the data update from the broadcast server prior to a broadcast time period elapsing, the data update or the notification of the data update informing the device that the broadcast server is capable of broadcasting.

4. The device of claim 1, wherein the instructions are further executable by the processor to determine that the broadcast server has changed from the first state to the second state in which the broadcast server is incapable of broadcasting in response to a broadcast time period elapsing without receiving, from the broadcast server, a message, the notification of the data update, or the data update.

5. The device of claim 4, wherein the instructions are further executable by the processor to operate a timer useable to determine that the broadcast time period has elapsed.

6. The device of claim 1, wherein, while the device is operating in the broadcast mode, the instructions are further executable by the processor to invalidate the portion of the data in the cache identified by the data update or the notification of the data update and to not invalidate other portions the data in the cache that are not identified by the data update or the notification of the data update.

7. The device of claim 1, wherein the instructions are further executable by the processor to operate a timer useable to determine that the cache time period has elapsed with the device unsuccessfully registering with the broadcast server.

8. A method comprising:
determining, by a cache server that stores data that is accessible to a plurality of client devices over a network, that a broadcast server is in a first state in which the broadcast server is capable of broadcasting;

operating the cache server in a broadcast mode during which a portion of the data stored is updated in response to receiving a data update or a notification of the data update from the broadcast server, the data update or the notification of the data update identifying the portion of the data;

determining that the broadcast server has changed from the first state to a second state in which the broadcast server is incapable of broadcasting; and switching operation of the cache server from the broadcast mode to a timer mode during which another portion of the data stored is updated in response to a cache time period elapsing, wherein the cache server communicates directly with one or more storage devices to fetch new cache data useable to update the other portion of the data stored while operating in the timer mode.

9. The method of claim 8, wherein the determining that the broadcast server is in the first state in which the broadcast server is capable of broadcasting is in response to receiving a message from the broadcast server prior to a broadcast time period elapsing, the message informing the cache server that the broadcast server is capable of broadcasting.

10. The method of claim 8, wherein the determining that the broadcast server is in the first state in which the broadcast server is capable of broadcasting is in response to receiving the data update or the notification of the data update from the broadcast server prior to a broadcast time period elapsing, the data update or the notification of the data update informing the cache server that the broadcast server is capable of broadcasting.

11. The method of claim 8, wherein the determining that the broadcast server has changed from the first state to the second state in which the broadcast server is incapable of broadcasting is in response to a broadcast time period elapsing without receiving, from the broadcast server, a message, the notification of the data update, or the data update.

12. The method of claim 11, further comprising operating a timer useable to determine that the broadcast time period has elapsed.

13. The method of claim 8, wherein, while the cache server is operating in the broadcast mode, the method further comprises invalidating the portion of the data identified by the data update or the notification of the data update and not invalidating other portions the data that are not identified by the data update or the notification of the data update.

14. The method of claim 8, further comprising operating a timer useable to determine that the cache time period has elapsed with the cache server unsuccessfully registering with the broadcast server.

15. One or more computer storage media having instructions that, when executed by one or more processors, cause a device to:
determine that a broadcast server is in a first state in which the broadcast server is capable of broadcasting;

operate the device in a broadcast mode during which a portion of the data stored in a cache is updated in response to receiving a data update or a notification of the data update from the broadcast server, the data update or the notification of the data update identifying the portion of the data, wherein the cache is accessible to a plurality of client devices over a network;

determine that the broadcast server has changed from the first state to a second state in which the broadcast server is incapable of broadcasting; and switch operation of the device from the broadcast mode to a timer mode during which another portion of the data stored in the cache is updated in response to a cache time period elapsing, wherein the device communicates directly with one or more storage devices to fetch new cache data useable to update the other portion of the data stored in the cache while operating in the timer mode.

16. The one or more computer storage media of claim 15, wherein the instructions further cause the device to determine that the broadcast server is in the first state in which the broadcast server is capable of broadcasting in response to receiving a message from the broadcast server prior to a broadcast time period elapsing, the message informing the device that the broadcast server is capable of broadcasting.

17. The one or more computer storage media of claim 15, wherein the instructions further cause the device to determine that the broadcast server is in the first state in which the broadcast server is capable of broadcasting in response to receiving the data update or the notification of the data update from the broadcast server prior to a broadcast time period elapsing, the data update or the notification of the data update informing the device that the broadcast server is capable of broadcasting.

18. The one or more computer storage media of claim 15, wherein the instructions further cause the device to:

determine that the broadcast server has changed from the first state to the second state in which the broadcast server is incapable of broadcasting in response to a broadcast time period elapsing without receiving, from the broadcast server, a message, the notification of the data update, or the data update; and operate a timer useable to determine that the broadcast time period has elapsed.

19. The one or more computer storage media of claim 15, wherein, while the device is operating in the broadcast mode, the instructions further causing the device to invalidate the portion of the data in the cache identified by the data update or the notification of the data update and to not invalidate other portions the data in the cache that are not identified by the data update or the notification of the data update.

20. The one or more computer storage media of claim 15, wherein the instructions further cause the device to operate a timer useable to determine that the cache time period has elapsed with the device unsuccessfully registering with the broadcast server.

\* \* \* \* \*